United States Patent

Bertz et al.

Patent Number: 5,228,205
Date of Patent: Jul. 20, 1993

[54] MOUNTING FOR THE SENSOR OF COORDINATE MEASURING MACHINES

[75] Inventors: Hans-Ulrich Bertz, Kuppenheim; Willi Meder, Ettlingen-Bruschhausen; Albert Neuthinger, Malsch-Volkersbach, all of Fed. Rep. of Germany

[73] Assignee: Dr.-Ing. Hofler MeBgeratebau GmbH, Ettlingen, Fed. Rep. of Germany

[21] Appl. No.: 959,484

[22] Filed: Oct. 9, 1992

Related U.S. Application Data

[63] Continuation of Ser. No. 746,769, Aug. 16, 1991, abandoned.

[30] Foreign Application Priority Data

Aug. 16, 1991 [DE] Fed. Rep. of Germany ....... 4025829

[51] Int. Cl.$^5$ ................................................ G01B 5/03
[52] U.S. Cl. ........................................ 33/556; 33/557; 33/559; 33/560; 33/572; 248/363
[58] Field of Search ............... 33/572, 556, 557, 559, 33/560, 503, DIG. 1, DIG. 2; 279/1 D, 1 M, 3, 20; 248/206.5, 205.5, 309.3, 363

[56] References Cited

U.S. PATENT DOCUMENTS

| | | | |
|---|---|---|---|
| 3,460,822 | 8/1969 | Link | 279/3 |
| 4,649,623 | 3/1987 | Schneider et al. | 279/1 M |
| 4,738,033 | 4/1988 | Ferber et al. | 33/559 |
| 5,018,278 | 5/1991 | Aehnelt et al. | 33/556 |
| 5,121,551 | 6/1992 | Linder et al. | 33/572 |

FOREIGN PATENT DOCUMENTS

| | | |
|---|---|---|
| 890725 | 4/1982 | Belgium . |
| 0194227 | 9/1986 | European Pat. Off. ......... 279/3 |
| 3320127 | 12/1984 | Fed. Rep. of Germany . |
| 8629693 | 3/1987 | Fed. Rep. of Germany . |
| 8701460 | 7/1987 | Fed. Rep. of Germany . |
| 3526108 | 9/1988 | Fed. Rep. of Germany . |
| 3811851 | 10/1989 | Fed. Rep. of Germany . |
| 0214674 | 10/1984 | German Democratic Rep. . |
| 278087 | 4/1990 | German Democratic Rep. . |
| 0037501 | 3/1983 | Japan ......... 33/572 |
| 58-37501 | 5/1983 | Japan . |

*Primary Examiner*—William A. Cuchlinski, Jr.
*Assistant Examiner*—Alvin Wirthlin
*Attorney, Agent, or Firm*—Willian, Brinks, Olds, Hofer, Gilson & Lione

[57] ABSTRACT

The sensing head of a coordinate measuring machine includes sensing pin combinations or sensing pins which are changeably fastened with high precision in respect to their spatial position. The receiver contains an isostatic three-point bearing against which the connecting body of the sensing pin is drawn by a pneumatically operated clamping arrangement. In the preferred embodiment the clamping arrangement consists of a suction cup and arresting elements for maintaining attachment of the receiving device to the connecting body when there is no subpressure acting upon the suction cup.

11 Claims, 1 Drawing Sheet

MOUNTING FOR THE SENSOR OF COORDINATE MEASURING MACHINES

This application is a continuation of application Ser. No. 07/746,769, filed Aug. 16, 1991, now abandoned.

BACKGROUND

The invention relates to a changeable mounting of a sensing pin or of a sensing pin combination to the sensing head of a coordinate measuring machine, in which a clamping device draws the connecting body of the sensing pin or of the sensing pin combination into a bearing clearly determining its position in a receiving device on the sensing head.

Such mountings are installed in the sensing heads of polycoordinate measuring machines, so that in the change of the measuring assignment, especially in automatic measuring, a sensing pin adapted to the corresponding measuring assignment or a correspondingly adapted sensing pin combination can be rapidly changed.

German Pat. No. DE-OS 33 20 127 discloses a receiver for the changeable fastening of a sensing pin or a sensing pin combination to the sensing head of a coordinate measuring machine, in which an electrically operating clamping device draws the connecting body of the sensing pin or of the sensing pin combination against a bearing clearly determining its position in the receiver on the sensing head.

In this electrically operating clamping device it is a matter either of a small electric motor with a threaded spindle or of an electromagnet, with which the field of a permanent magnet is compensated or reinforced.

A disadvantage of these arrangements is that, in the first place, they are relatively heavy and thus increase the inert mass, unfavorable for rapid, positionally accurate movements of the sensing head and, in the second place, they emit heat in their operation, which in the case of frequent sensing pin changes has a disadvantageous effect both on the stopping accuracy of the sensing pins and also on the measuring accuracy.

Further, German Pat. No. DE-PS 35 26 108 discloses a receiver for the changeable fastening of a sensing pin or of a sensing pin combination to the sensing head of a coordinate measuring machine, in which a mechanical clamping mechanism acting on the connecting body of the sensing pin or sensing pin combination is used, in order to draw the pin against a bearing clearly determining its position in the receiver on the sensing head. This clamping mechanism, however, upon a collision between the sensing pin and the workpiece, does not disengage, so that there exists the danger that in the process the entire sensing head will be damaged.

Furthermore, Japanese patent abstract 58-37 501 (A) discloses a measuring head in which the shaft of a sensing pin is held over subpressure in a bore on the sensing head.

Aside from the possibility lacking hereof exactly defining the angular position especially of a sensing pin combination, with this sensing pin mounting, too, the sensing head can be damaged if through a wrong operation there occurs a collision between the sensing pin and the workpiece.

The problem of the invention, therefore, is to specify a mounting with which the clamping arrangement only increases by a small amount the inert mass of the mounting and in the operation of which there arises no heat burdening of the mounting. Simultaneously, the device must be economical in its manufacture and secure in operation.

SUMMARY OF THE INVENTION

This problem is solved according to the invention by the means that the clamping arrangement is formed by an elastic suction cup actable upon by subpressure between the receiving device and the connecting body.

One advantage and object of the invention is that, in the first place, it can be constructed very small and thus the entire sensing head can be formed smaller and lighter. In the second place, by varying the subpressure, the holding force between receiving device and connecting body can be varied within a large range, without the heat burdening of the sensing head being thereby affected. Furthermore, the connection is released if in a collision excessively high forces are transferred from the sensor onto the sensing head, so that the measuring machine can be protected against mechanical damage.

The elastic suction cup which forms the connection actable upon with subpressure between the receiving device and the connecting body has the advantage that it is variable within certain limits in respect to the fitting accuracy between the connecting body and the receiving device.

If the connection actable upon with subpressure is evacuable through a bore which ends in the volume bounded by the suction cup, especially a middle bore of the receiving device, then by simple control of the subpressure the holding force between receiving device and connecting body can be adapted to the weight of the sensing pin or sensing pin combination present on the connecting body, so that these are always held with equal security.

It is advantageous if the connecting body has a smooth surface which corresponds to the suction cup present on the receiving device, or that the receiving device presents a smooth surface which corresponds to the suction cup present on the connecting body. In both cases there can be assured in this manner a high operating security, the first form of execution being preferable, since with it, even in the case of several differing sensing pins or sensing pin combinations, only one suction cup, namely on the receiving device, is required.

In order to prevent the result that upon dropping of the subpressure supply the sensing pin or the sensing pin combination will fall out of the receiving device and possibly be damaged, there can be arranged, between the receiving device and connecting body, additional automatically acting arresting elements which are fastened to the receiving device and/or to the connecting body, so that in the situation described the connecting body will not fall out of the receiving device.

These arresting elements may be constructed many different ways. One possibility is to construct them as at least one permanent magnet which, with its magnetic force, compensates for the weight force of the connecting body with the sensing pin or the sensing pin combination.

Another possibility is to use small suction cups which in operation of the clamping arrangement are actuated independently of the main suction cup and still continue to hold the connecting body when no subpressure prevails any longer in the main suction cup.

A further manner of forming arresting elements is to use so-called bur connections, which by reason of their specific manner of function are distinctively insensitive to dirt.

Furthermore, it should still be mentioned that the arresting elements can be mechanical stopping elements, such as, for example, latches, ball rests or similar security elements.

Depending on demand on the clamping joints, the corresponding components may consist both of metal and also of plastic.

In order to achieve a space-saving construction form, it is favorable to arrange the arresting elements inside the volume acted upon with subpressure. In order to avoid an influencing of clamping arrangement and arresting element, it may, however, also be purposeful to arrange the arresting elements outside the volume acted upon with subpressure.

In order not to have to prescribe any too close tolerances between connecting body and receiving device, it is advantageous if the arresting elements are joined over springily elastic intermediate members with the receiving device of the connecting body, or if the arresting elements joined with the receiving device or the connecting body act on a springily elastic intermediate member, joined with, in each case, the oppositely lying part. There, in a preferred embodiment of the disclosed invention, this intermediate member is an annular membrane spring protruding onto the arresting element.

In order to further reduce the inert mass, already mentioned above, of the sensing head, it is advantageous to make the connecting body out of light metal or of plastic.

According to the disclosed embodiment, the intermediate member present on this connecting body would consist of another material so that, for example, a permanent magnet functioning as an arresting element, fastened to the receiving device, would interact with an annular membrane spring made of magnetic material, which is fastened to a connecting body manufactured for light metal or plastic.

In order clearly to define the position of the connecting body in the receiving device, either on the receiving device or on the connecting body, there can be three pairs of cylindrical bodies which correspond in each case to one of three ball caps on the other part. It is also possible, however, to replace the pairs of the cylindrical bodies by ball pairs, which then correspond in each case with one of three cylindrical bodies on the other part.

In order to construct the three-point bearing described as stable as possible, the three resting places are distributed uniformly on a circle. Thereby, however, the angular position of the connecting body in the receiving device is not to be defined exactly, but only in steps of 120°, which is not justifiable, especially in the case of sensing pin combinations. In order to surely define the angular position of the connecting body and the sensor of the sensing pin combination in the receiving device, a pin is provided. The pin is either on the connecting body which corresponds to a recess on the receiving device, or on the receiving device which corresponds to a recess on the connecting body.

Further advantages and features of the invention are yielded from a description of the preferred embodiment.

DETAILED DESCRIPTION OF THE PREFERRED EMBODIMENT

Figure 1:
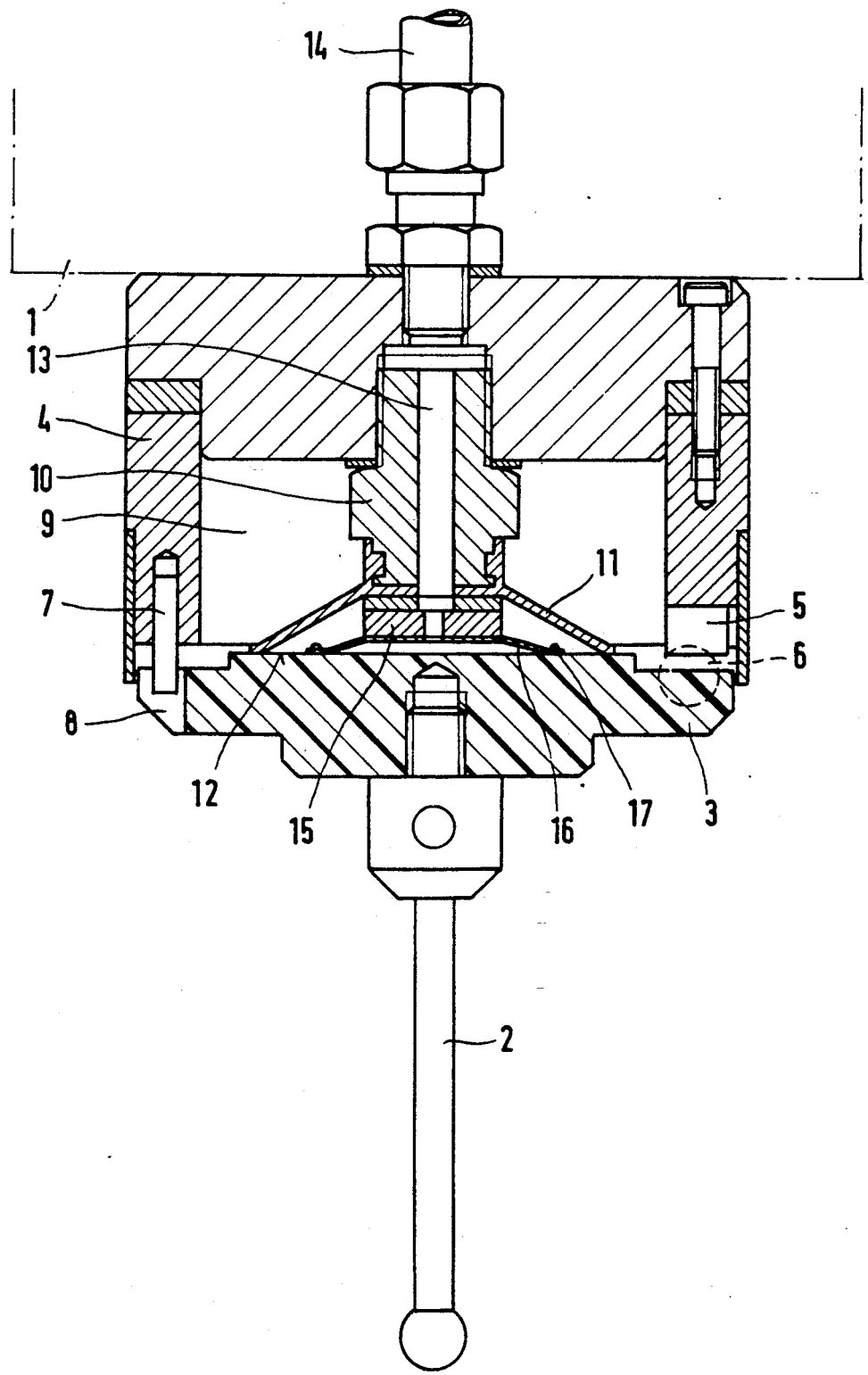
FIG. 1 shows a section of the mounting according to the invention.

To a sensing head 1 of a coordinate measuring machine there is fastened a sensing pin 2. The sensing pin 2 is screwed into a bore on the underside of a substantially disk-form connecting body 3, which lies on a pot-shaped receiving device 4, which is fastened to the sensing head 1.

In order, with connecting body 3 present in engagement on the receiving device 4, to determine exactly the position of the connecting body 3, the receiving device 4 has on its lower outer edge three cylindrical bodies 5, which interact with a bearing comprising three ball pairs 6, which lie on the upper side of the connecting body 3. Furthermore, the receiving device 4 is provided with an additional marking pin 7, which corresponds to a recess 8 on the connecting body 3, and thus additionally defines its position.

In order to couple the connecting body 3 firmly to the receiving device 4, this latter has a clamping arrangement 10 in a cavity 9 open downward, substantially closed by the connecting body 3.

In the example represented, this clamping device is a suction cup 11 which cooperates with a smooth surface 12 of the connecting body 3 and can be evacuated through a bore 13.

If evacuation is carried out through the bore 13 of the space bounded by the suction cup 11 and the smooth surface 12, the connecting body 3, by reason of the acting forces, is drawn into the receiving device 4, so that it is drawn over its ball pairs 6 firmly onto the cylindrical bodies 5.

If the subpressure should inadvertently be lost on the subpressure line 14, then the danger is present that the connecting body 3 will fall off from the receiving device 4, in which case both the sensing pin 2 and also the workpiece to be measured can be damaged.

In order to prevent this, on the clamping device 10 a permanent magnet 15 is centrally mounted in the suction cup 11, to which there adheres an annular membrane spring 16 which is jointed over rivets or screws 17 with the connecting body 3.

By this annular membrane spring 16 two essential points can be achieved: In the first place, with choice of an annular membrane spring of magnetic material, for example soft iron, the connecting body 3 can be made of any arbitrary material, for example of plastic or of light metal, which offers weight advantages.

In the second place, the magnetic forces work best with direct engagement of the drawn-on body and through the elasticity of the annular membrane spring it is assured that, without slight manufacturing tolerances being necessary, the connecting body 3 is in contact both with the permanent magnet 16 and also with the three-point bearing determining its exact position, which is formed by the ball pairs 6 with the cylindrical bodies 5.

A regular change cycle runs off as follows: the sensing head 1 is conveyed with the receiving device 4 over the connecting body 3 readied in a magazine, and lowered onto this. By action upon the suction cup 11 with subpressure through the subpressure line 14 and the bore 13, the connecting body 3 with the sensing pin present on it with its ball pair 6 is drawn firmly against the cylindrical bodies 5. The sensing head 1 then travels back in which process it removes the connecting body 3 with its sensing pin 2 from the magazine.

According to the measuring assignment the sensing head 1 travels back to the position in which it has taken the connecting body 3 with the sensing pin 2 and descends until connecting body 3 and sensing pin 2 are in their desired place in the magazine. The subpressure in the suction cup 11 is then switched off and the sensing head 1 travels back with the receiving device 4. By a slight clamping of the connecting body 3 or of the sensing pin 2 in the magazine, the connection between the permanent magnet 15 and the annular membrane spring 16 is parted, so that the sensing head 1 with the receiving device 4 can receive another sensing pin or another sensing pin combination.

In order to release the connection between the sensing head 1 and the connecting body 3 with its sensing pin 2, the space bounded by the suction cup 11 can be briefly acted upon with excess pressure through the bore 13. Thus a depositing of the connecting body 3 with its sensing pin 2 in the magazine is facilitated.

I claim:

1. A mounting for the changeable fastening of a sensing pin or of a sensing pin combination to the sensing head of a coordinate measuring machine comprising:
    a coordinate measuring machine having a sensing head;
    a receiving device connected to the sensing head, the receiving device having a bearing;
    a connecting body connected to the sensing pin or the sensing pin combination; and
    a clamping device drawing the connecting body into the bearing so as to determine the position of the sensing pin or sensing pin combination in the receiving device on the sensing head wherein the clamping device comprises a suction cup having a volume actable upon with subpressure between the receiving device and the connecting body and having at least one arresting element connected to the receiving device and arranged inside the volume actable upon with subpressure for maintaining attachment of the receiving device to the connecting body when there is no subpressure.

2. The mounting of claim 1 wherein the clamping device has a bore which extends into a volume bounded by the suction cup, the bore being through which the subpressure between the receiving device and the connecting body is actable.

3. The mounting of claim 1 wherein the connecting body has a smooth surface corresponding to the suction cup of the receiving device.

4. The mounting of claim 1 wherein the at least one arresting element comprises at least one permanent magnet.

5. The mounting of claim 1 wherein the connecting body is comprised of a light-weight metal.

6. The mounting of claim 1 wherein the connecting body is comprised of a plastic.

7. The mounting of claim 1 wherein the bearing determining the position of the connecting body in the receiving device is formed by three pairs of cylindrical bodies on the receiving device.

8. The mounting of claim 1 wherein the bearing determining the position of the connecting body in the receiving device is formed by three ball pairs on the receiving device.

9. The mounting of claim 1 wherein the position of the sensing pin or sensing pin combination of the connecting body is further determined by the connecting body having a recess which corresponds with a marking pin on the receiving device.

10. An apparatus for changeably mounting a sensing pin of a coordinate measuring machine comprising:
    a sensing head engaging the coordinate measuring machine;
    a receiving device engaging the sensing head;
    a connecting body engaging the receiving device, the connecting body having a sensing pin;
    means for establishing the position of the connecting body relative to the receiving body; and
    a clamping device attached to the receiving device, the clamping device having a magnet mounted to engage the connecting body so that the magnet removably retains the connecting body, a suction cup mounted to engage the connecting body, a bore extending through the clamping device and into the suction cup so that upon creation of a subpressure in the bore the suction cup nonremovably retains the connecting body.

11. A mounting for the changeable fastening of a sensing pin or of a sensing pin combination to the sensing head of a coordinate measuring machine comprising:
    a coordinate measuring machine having a sensing head;
    a receiving device connected to the sensing head, the receiving device having a bearing;
    a connecting body connected to the sensing pin or the sensing pin combination; and
    a clamping device drawing the connecting body into the bearing so as to determine the position of the sensing pin or sensing pin combination in the receiving device on the sensing head wherein the clamping device comprises a suction cup actable upon with subpressure between the receiving device and the connecting body and having arresting elements connected to the receiving device, said arresting elements act upon an annular membrane spring connected to the connecting body for maintaining attachment of the receiving device to the connecting body when there is no subpressure.

* * * * *

UNITED STATES PATENT AND TRADEMARK OFFICE
CERTIFICATE OF CORRECTION

PATENT NO. : 5,228,205
DATED : July 20, 1993
INVENTOR(S) : Hans-Ulrich Bertz et al.

It is certified that error appears in the above-indentified patent and that said Letters Patent is hereby corrected as shown below:

Column 5, line 21, delete "I" and substitute --We--.

Signed and Sealed this

Thirteenth Day of September, 1994

Attest:

BRUCE LEHMAN

Attesting Officer     *Commissioner of Patents and Trademarks*